United States Patent [19]

Nagy

[11] 4,065,171
[45] Dec. 27, 1977

[54] GLARE SHIELD FOR AUTOMOBILES

[76] Inventor: Frank Nagy, 8400 Seymour Road, Gaines, Mich. 48436

[21] Appl. No.: 655,683

[22] Filed: Feb. 6, 1976

[51] Int. Cl.² ............................................. B60J 3/00
[52] U.S. Cl. .................................. 296/97 E; 248/364
[58] Field of Search ............... 296/97 E, 97 D, 97 C, 296/97 H, 97 R; 248/364, 1

[56] References Cited

U.S. PATENT DOCUMENTS

| | | | |
|---|---|---|---|
| 2,813,749 | 11/1957 | Wetig | 296/97 E |
| 2,916,184 | 12/1959 | Hartley | 248/1 |
| 3,022,109 | 2/1962 | Hauskama | 296/97 D |
| 3,863,882 | 2/1975 | Hatcher | 248/364 |

Primary Examiner—Philip Goodman
Attorney, Agent, or Firm—Fisher, Gerhardt & Groh

[57] ABSTRACT

A glare shield adapted to be positioned within the passenger compartment of a motor vehicle adjacent to the windshield to absorb and intercept light rays in which the glare shield is made up of flexible material forming compartments containing ballast material acting as a base to support a relatively flexible shield member which may be deflected to various positions relative to the base member.

6 Claims, 7 Drawing Figures

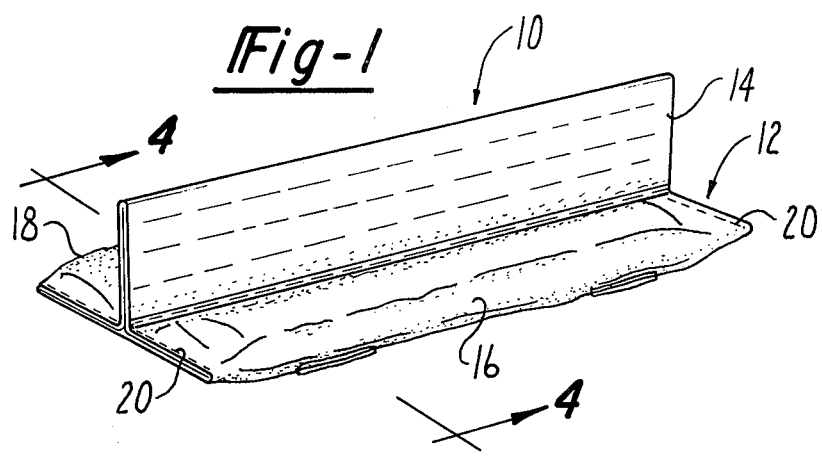
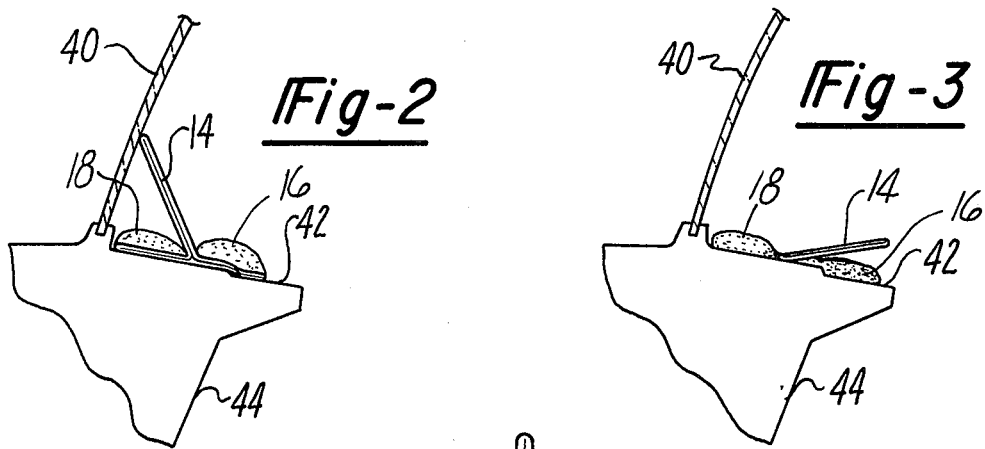
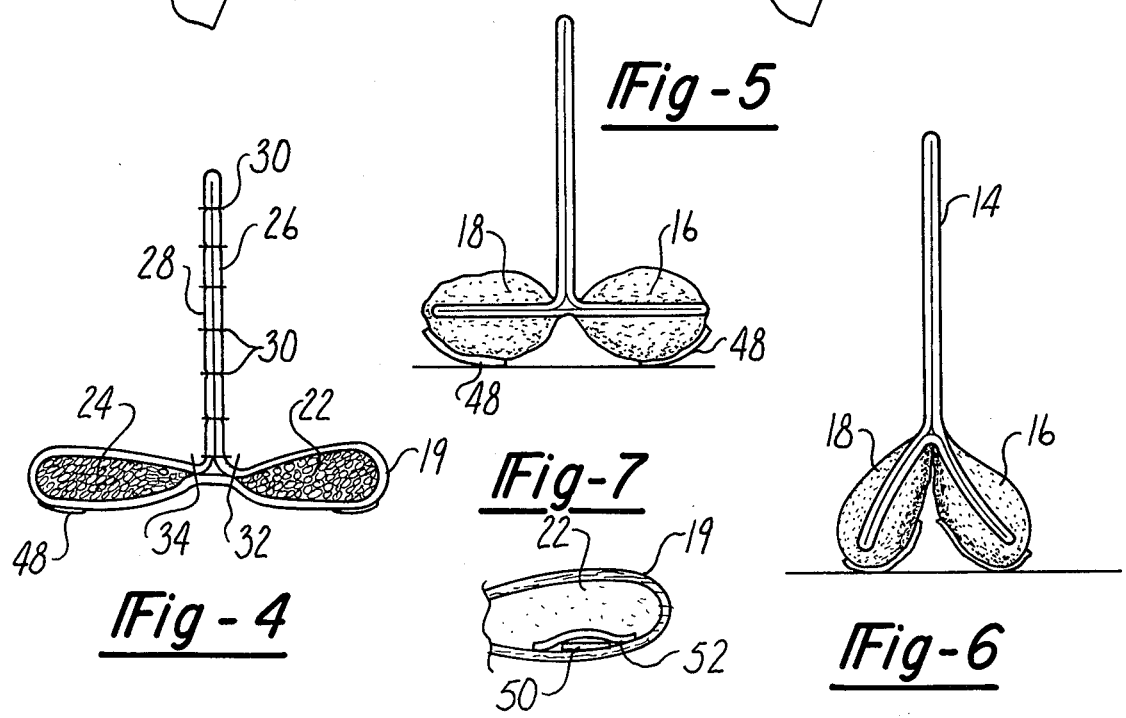

GLARE SHIELD FOR AUTOMOBILES

This invention relates to glare shields for use with automobiles and more particularly to glare shields adapted to be positioned within the passenger compartment of a motor vehicle adjacent to the windshield to absorb and intercept light rays.

Today's automobiles are provided with sun visors to intercept and block overhead rays of the sun so that they do not interfere with the visibility of the operator and vehicle passengers. However, such visors are ineffective to intercept light rays which reflect from the highly polished hood surfaces, ornamental trim and metallic windshield wipers which reflect the overhead sun rays directly into the eyes of the vehicle passengers. In an attempt to solve this problem various devices have been made requiring permanent or semipermanent attachment to the vehicle windshield cowl located directly rearwardly of the windshield and above the usual instrument panel of the vehicle.

It is an object of the present invention to provide a glare shield for use within a vehicle which does not require installation and special fastening means.

Still another object of the invention is to provide a glare shield which is soft and flexible and which does not form a hazard upon contact with a vehicle occupant in the event of a collision.

Still another object of the invention is to provide a glare shield formed of flexible light absorbent material which may be positioned in various locations adjacent to the windshield and may be readily adjusted to intercept reflections from the exterior of the vehicle passing through the windshield.

A glare shield is provided which is made of a light absorbing material such as a cloth and is arranged to form a flexible closed compartment which contains ballast in the form of separate particles such as shot or beans. A shield member is flexibly connected to the base member and is itself relatively flexible but stiffer than the walls of the base member so that the shield member may be temporarily formed and positioned in various attitudes relative to the base member to intercept light rays from the exterior of the vehicle.

FIG. 1 is a perspective view of the glare shield embodying the present invention;

FIG. 2 is an end elevation of the glare shield showing it in position within a motor vehicle compartment;

FIG. 3 is a view similar to FIG. 2 showing another position of the glare shield;

FIG. 4 is a sectional view taken generally on line 4—4 in FIG. 1;

FIG. 5 is an end view of the glare shield at an enlarged scale indicating positioning of the shield portion at a selected vertical height;

FIG. 6 is a view similar to FIG. 5 showing another position of the shield portion; and FIG. 7 is a sectional view of a portion of the glare shield seen in FIG. 4 showing an alternate form of friction device to secure the glare shield in position.

Referring to the drawings the glare shield embodying the invention is designated generally at 10 and includes the base portion 12 and a shield portion 14.

In the preferred embodiment of the invention, the base 12 includes a pair of generally tubular housing portions 16 and 18, the walls 19 of which are made of a flexible material, preferably a cloth such as felt or toweling material. Such material not only is flexible but has a rough texture which serves to absorb light rays. To facilitate light absorption, the material preferably is of a dark color. The ends of the tubular portions 16 and 18 are closed as by stitching indicated at 20 to form closed, tubular compartments indicated in FIG. 4 at 22 and 24.

The compartments 22 and 24 contain a quantity of loose ballast material such as beans, shot or gravel. The volume of the ballast material is less than the maximum volume of the compartments 22 and 24 so that the flexible walls 19 of the compartments 22 and 24 contain the ballast material but allow the housing portions 16 and 18 to be shaped and formed to assume various positions including the relatively flat positions indicated in FIGS. 2 through 4.

The shield 14 is preferably formed of the same material as the base member and in the drawings is shown as comprised of two layers of the same material which forms the walls of the housing 12. The two layers of material 26 and 28 are joined together by generally parallel rows of stitching indicated at 30. However, it will be understood that the use of adhesive or other fastening means is not precluded.

As seen in FIG. 4, a preferred construction of the glare shield includes a single piece of material which is stitched at 32 and 34 to form marginal edges of compartments 22 and 24 and is also stitched at 30 to form the shield 14. The ends of the housing portions 16 and 18 are further stitched at one end of the housing portions 16 and 18 by means of the stitching 20. Thereafter the quantity of ballast material is placed in the compartments 22 and 24 and stitching is added to the open end of the housing portions 16 and 18 to contain the ballast material.

In operation the glare shield is disposed adjacent to the vehicle windshield 40 and is typically supported on the windshield cowl 42 directed to the rear of the windshield 40 and above the usual vehicle instrument panel indicated at 44. If desired the base 12 of the glare shield 10 may be manipulated to shape it so that the housing portions 12 and 14 are relatively flat as indicated in FIG. 3 and so that the shield portion 14 lies substantially horizontally and generally parallel to one of the housing portions 16 and 18.

The flexible shield portion 14 which is stiffer than the walls of the housing portions 16 and 18 may be pivoted or flexed relative to the base 12 and positioned in various locations such as that illustrated in FIG. 2. By manipulating the housing portions 16 and 18 to redistribute the ballast in the compartments 22 and 24, the shield portion 14 is held in the selected position. As indicated also in FIGS. 5 and 6 the vertical height of the shield portion 14 may be regulated and selected by molding the base portions 16 and 18 since the ballast material has a tendency to retain the configuration given to it by squeezing the walls of the compartments 22 and 24.

The rough texture of the material such as toweling or felt which is used to construct the glare shield is effective to absorb light rays and absorbing light may be further enhanced by selecting a dark colored material. The rough textured material not only absorbs light rays but engages the windshield cowl 42 and frictionally resists shifting of the glare shield on the windshield cowl. However, shifting of the glare shield can be further resisted by sewing or otherwise fastening friction elements in the form of adhesive strips 48 to the underside surfaces of the housing portions 16 and 18. Alternatively, the friction elements may be formed by small magnets 50 located in pockets 52 formed on the walls 19 in the compartments 22 or 24 as seen in FIG. 7. The magnet 50 acts with the cowl portion which usually is made of magnetic material to secure the glare shield 10 in its selected position.

A glare shield for use with automobiles or the like has been provided which is constructed of flexible cloth like material to form compartments containing ballast material which serves to hold the glare shield in position on the cowl of the windshield. The glare shield includes a shield portion which is fastened to the base portion so that it may be moved to various angular attitudes relative to the base portion to intercept light rays passing from the exterior of the vehicle to the passenger compartment.

The embodiments of the invention in which an exclusive property or privilege is claimed are defined as follows:

1. A glare shield for use with automobiles or the like comprising; a base member having walls of flexible cloth-like material forming a closed compartment, ballast means in the form of separate particles loosely contained in said compartment, and a flexible shield member formed of the same cloth-like material as said base member and being less flexible than said walls of said compartments, said shield member being joined to said base member for deflection to various selected angular positions relative to said base member for any given position of said base member.

2. The combination of claim 1 in which said ballast means has a volume less than the maximum volume of said compartments.

3. The combination of claim 1 in which said base member is elongated and said shield member is joined to said base member to be disposed in parallel relationship thereto.

4. The combination of claim 1 in which said base member and shield member are formed of a flexible material and in which said walls of said base member are formed of a single layer of said material and in which said shield members is formed of two layers of said material.

5. The combination of claim 1 in which said base member includes two parallel disposed housing portions forming a pair of compartments, said housing portions being joined together at adjacent marginal portions of said housing portions, said shield member being fastened to said marginal portion.

6. The combination of claim 1 wherein the material forming said compartment and shield member is of rough texture to absorb light rays.

* * * * *